United States Patent [19]

Saeki

[11] Patent Number: 4,928,151
[45] Date of Patent: May 22, 1990

[54] APPARATUS FOR AUTOMATICALLY AND CIRCULATIVELY FEEDING ORIGINALS

[75] Inventor: Shiro Saeki, Yokohama, Japan

[73] Assignee: Ricoh Company, Ltd., Tokyo, Japan

[21] Appl. No.: 223,333

[22] Filed: Jul. 25, 1988

[30] Foreign Application Priority Data

Jul. 30, 1987 [JP] Japan .................. 62-191114

[51] Int. Cl.⁵ .............................. G03G 15/00
[52] U.S. Cl. ..................... 355/320; 271/3.1
[58] Field of Search ............... 355/14 SH, 3 SH, 319, 355/317, 315, 309; 271/3.1, 65, 186, 225, 902, 121, 124, 176, 220, 125

[56] References Cited

U.S. PATENT DOCUMENTS

| 4,169,674 | 10/1979 | Russel | 355/14 SH |
| 4,428,667 | 1/1984 | Phelps et al. | 355/317 |
| 4,705,265 | 11/1987 | Hirota et al. | 271/125 |
| 4,744,553 | 5/1988 | Hirose | 271/3.1 |

FOREIGN PATENT DOCUMENTS

| 0113226 | 6/1985 | Japan | 355/14 SH |
| 0244734 | 12/1985 | Japan | 271/121 |
| 0264138 | 11/1987 | Japan | 271/121 |
| 0275950 | 11/1987 | Japan | 271/3.1 |

Primary Examiner—Joan H. Pendegrass
Attorney, Agent, or Firm—Oblon, Spivak, McClelland, Maier & Neustadt

[57] ABSTRACT

An apparatus for automatically and circulatively feeding originals comprises an original feed-out section for sequentially feeding out the originals stacked therein from an original placed at a lowermost position, each image to be copied of the stacked original being kept facing downwardly, and an original reversing section provided with a reversing roller for reversing the direction of movement of the original exposed at an original exposure section. In the case of both-side copy, the exposed original is guided through a first reversing path in the direction of the original feed-out section by means of clockwise rotation of the reversing roller, and in the case of single-side copy, the exposed original is guided through a second reversing path in the direction of the original feed-out section by means of counterclockwise rotation of the reversing roller.

11 Claims, 3 Drawing Sheets

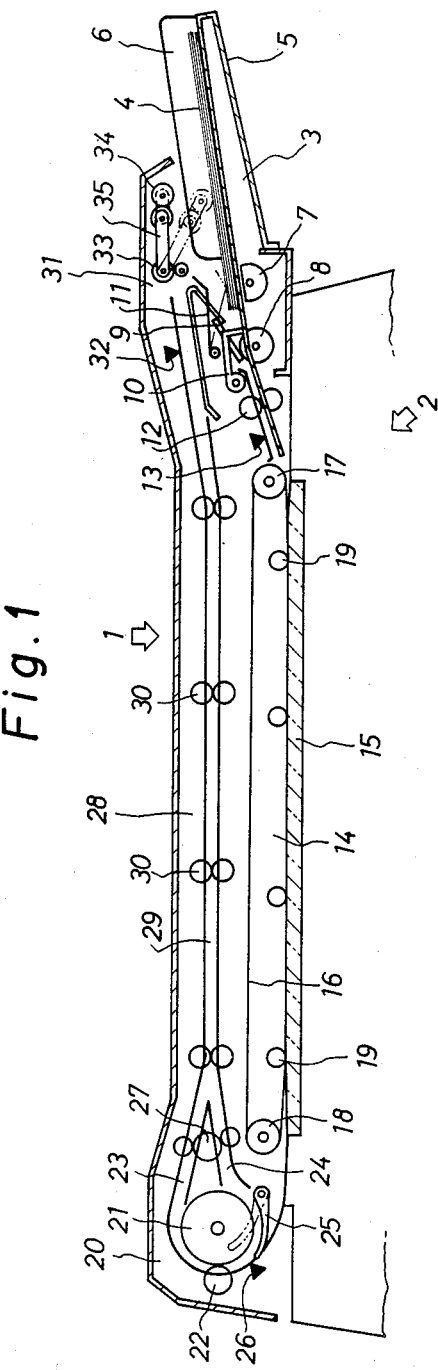
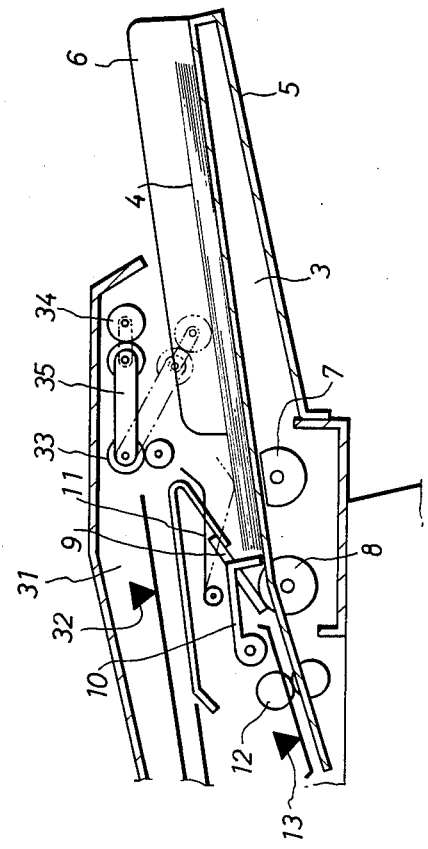
Fig.1
Fig.2

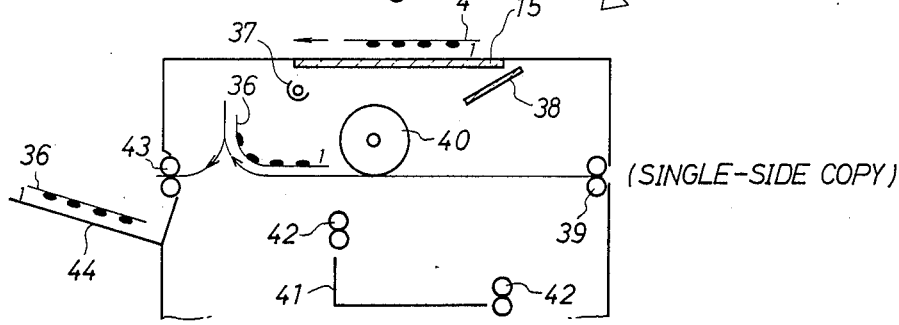
Fig. 6 (SINGLE-SIDE COPY)
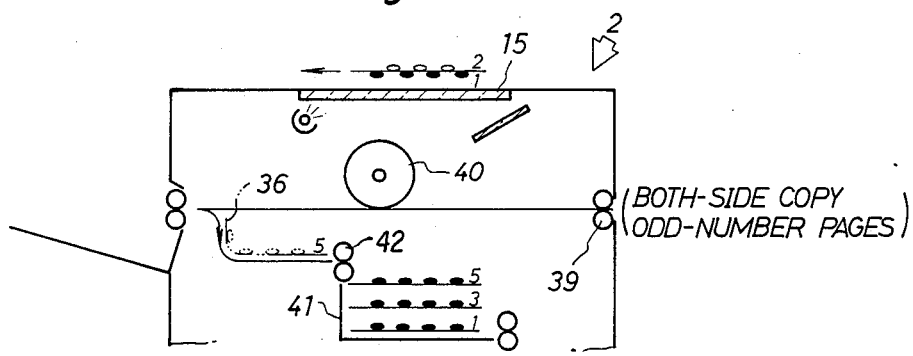
Fig. 7 (BOTH-SIDE COPY ODD-NUMBER PAGES)
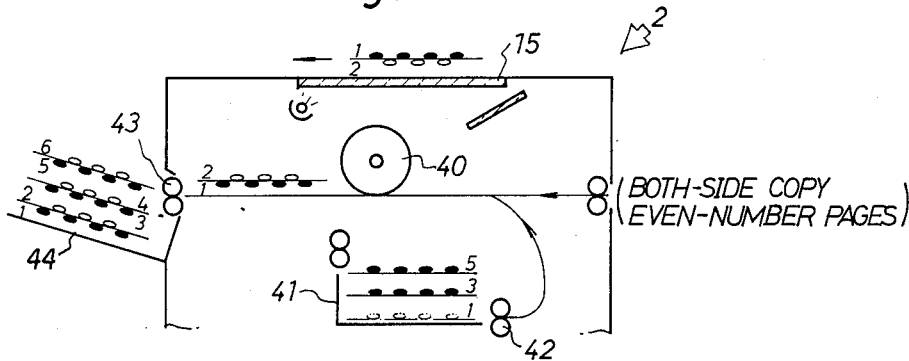
Fig. 8 (BOTH-SIDE COPY EVEN-NUMBER PAGES)

APPARATUS FOR AUTOMATICALLY AND CIRCULATIVELY FEEDING ORIGINALS

BACKGROUND OF THE INVENTION

The present invention relates to apparatus for automatically and circulatively feeding originals for use in continuously copying a single-side or both sides of a sheet of double-side printed original.

In a conventional apparatus for automatically and circulatively feeding originals, originals are set on an original table such that the respective images on the originals face upwardly, sequentially fed out, starting with the last or lowermost page, and copied.

In this case, the manner in which an original is fed out is by air, so that the apparatus itself is required to have a large scale and the cost is high.

This apparatus further has the problems that the original conveyance path for performing both-side copy is very complicated, that when both-side copy is performed, the front and back faces of each original are copied sequentially, so that it takes a considerable time to copy a sheet of original, and that as the number of copies increases, the copy efficiency is greatly reduced.

SUMMARY OF THE INVENTION

It is an object of the present invention to provide an apparatus for automatically and circulatively feeding originals which has a compact structure and is capable of improving the copy efficiency.

In order to achieve the above object, the present invention provides an apparatus for automatically and circulatively feeding originals comprising:

an original feed-out section for sequentially feeding out the originals stacked therein from an original placed at a lowermost position, each image to be copied of the stacked original being kept facing downwardly;

an original exposure section disposed along the direction of movement of the fed-out original for exposing the fed-out original;

an original reversing section disposed on the opposite side to the original feed-out section with respect to the original exposure section, and having a reversing roller capable of rotating in both clockwise and counterclockwise directions for reversing the direction of movement of the original exposed at the original exposure section;

a first reversing path extending from a top of the reversing roller in the direction of the original feed-out section for guiding the original in the direction opposite to the direction of movement of the exposed original by means of clockwise rotation of the reversing roller when both-side copy is performed;

a second reversing path extending from a bottom of the reversing roller in the direction of the original feed-out section for guiding the original in the direction opposite to the direction of movement of the exposed original by means of counterclockwise rotation of the reversing roller when single-side copy is performed;

a conveyance path connected at one end thereof with the first and second reversing paths and extending from the connected portion of the first and second reversing paths in the direction of the original feed-out section; and an original discharge section connected to the other end of the conveyance path and disposed above the original feed-out section for discharging the original conveyed along the conveyance path thereinto.

Thus, both-side copy is performed only by clockwise rotation of the reversing roller without counterclockwise rotation, so that the copying time is shortened and hence the copy efficiency is increased. Switching between single-side copy and both-side copy is simply performed only by changing the direction of rotation of the reversing roller, so that the conveyance path of an original is simplified and the apparatus becomes compact.

BRIEF DESCRIPTION OF THE DRAWINGS

FIG. 1 is a cross sectional view showing an embodiment of the present invention;

FIG. 2 is an enlarged side view of an original feedout section of the original;

FIG. 6 illustrates the movement of a sheet of transfer paper when single-side copy is performed;

FIG. 7 illustrates the movement of a sheet of transfer paper in a case of copying odd-number pages in the both-side copying mode; and FIG. 8 illustrates the movement of a sheet of transfer paper in a case of copying even-number pages in the both-side copying mode.

DETAILED DESCRIPTION OF THE PREFERRED EMBODIMENTS

Figure 3:
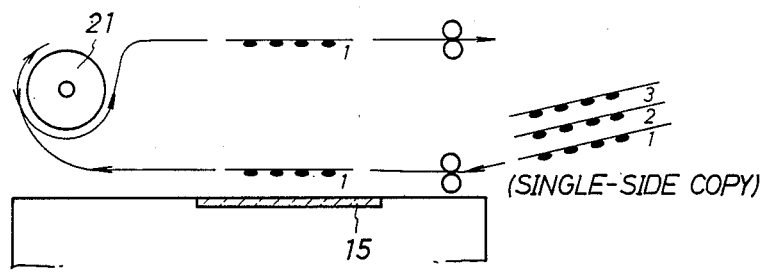
FIG. 3 illustrates the movement of an original in a case of copying a single-side of the original.

An embodiment of the present invention will now be described with reference to FIGS. 1 and 2. The apparatus 1 is disposed on a main body of the copying apparatus 2. The structure of other sections is as follows.

An original feed-out section 3 includes an original table 5 on which sheet-like originals 4 are placed, and which is provided on each side of the table 5 with an original fence 6 for preventing lateral displacement of the originals 4. Disposed on a lower portion of the table 5 are in turn a semicircular pull-in roller 7 made of sponge which separates the originals 4 sheet by sheet and a separation roller 8 comprising a muller bar. Disposed above the separation roller 8 is a stopping member 9 made of urethane which is pressed against the separation roller 8, for example, by a spring (not shown). The rollers 7 and 8 are separately driven by motors (not shown) and adapted to perform one complete rotation each time an original 4 is fed out.

The original feed-out section 3 is further provided above the stopping member 9 with an inlet pawl 10 for stopping originals 4 to be set and with a pushing member 11 which pushes down the originals 4 from above. The original feed-out section 3 is further provided with pull-out rollers 12 which pull out an original 4 separated by the separation roller 8, and with a photo-sensor 13 which senses the presence of the inserted original 4.

The pull-out rollers 12 are driven by a separate motor (not shown) and provides to an original a high roller pressure that overcomes the pulling back pressure produced by the stacked documents to thereby convey an original. The separation roller 8 is coupled through clutch (not shown) to a drive means thereof such that when the roller 8 receives a force higher than a predetermined value from an original 4, it is idled.

An original exposure section 14 has an endless conveyor belt 16 on a contact glass plate 15 formed on an upper portion of the copying apparatus 2. Disposed inside the conveyor belt 16 are a belt drive roller 17 which drives the belt 16, and a belt follower roller 18. In addition, disposed inside the conveyor belt 16 are four belt presser rollers 19.

An original reversing section 20 includes a reversing roller 21 capable of rotating in both clockwise and counterclockwise directions so as to change the direction of movement of an incoming original 4 which has been exposed to light. The reversing roller 21 is provided in contact therewith with an auxiliary roller 22. The original reversing section 20 further includes a first reversing path 23 along which the original 4 passes when the reversing roller 21 is rotated in the clockwise direction, and a second reversing path 24 along which the original 4 passes when the reversing roller 21 is rotated in the counterclockwise direction.

Disposed below the reversing roller 21 is a reversing guide 25 for guiding an original 4 to the second reversing path 24. A reversing sensor 26 is disposed in the vicinity of an inlet to the first reversing path 23 to check the presence of an inserted original 4. A conveyance roller 27 is disposed in the vicinity of the outlets of the first and second reversing paths 23 and 24. The roller 27 is capable of rotating in both clockwise and counterclockwise directions.

An original conveying section 28 includes a linear conveyance path 29 along which an original 4 fed out from the first or second reversing path 23 or 24 passes and four pairs of conveyance rollers 30 positioned at four positions along the conveyance path 29.

An original discharge section 31 includes a discharge sensor 32 which checks the presence of an original 4 fed from the original conveying section 28, a discharge roller 33 which discharges the original 4, a pull-back roller 34 which pulls back the discharged original 4, and a feed lever 35 which couples the roller 33 and 34.

The main body of copying apparatus 2 disposed below the apparatus 1 will now be described with reference to FIG. 6 by focusing mainly to portions of the copying apparatus involving the movement of a sheet of transfer paper 36. Disposed on top surface of the main body of copying apparatus 2 is the contact glass plate 15 on which an original 4 is placed. Disposed below the contact glass plate 15 are a light source 37 which illumines an original 4, and a reflective mirror 38 which reflects the light from the light source 37.

Disposed under the reflective mirror 38 are a pull-in roller 39 which pulls in a sheet of transfer paper 36 and a photosensitive drum 40 which copies an image of the original 4 onto the pulled-in sheet of transfer paper 36. Disposed below the drum 40 is a both-side tray 41 in which transfer papers 36 are accommodated when both-side copy is performed. A pair of rollers 42 is disposed at each of the inlet and outlet of the both-side tray 41 to insert and take out respective sheets of transfer paper 36 sheet by sheet. A pair of discharge rollers 43 is disposed on one side of the main body of copying apparatus 2 to feed the copied sheet of transfer paper 36 out of the copying apparatus 2. A tray 44 is disposed on the one side of the copying apparatus 2 to accommodate the discharged sheets of transfer paper 36.

In such structure, single-side copy and both-side copy will be described separately by focusing mainly to the movement of an original 4 in the apparatus 1.

First, the single-side copy will be described with reference to FIGS. 1–3.

At the original feed-out section 3, a plurality of originals 4 are stacked on the original table 5 such that the respective images on the originals face downwardly and are sequentially set, starting with the first original, such that they abut on the inlet pawl 10 and further the original fences 6 are moved so as to keep in accordance with the width of the originals 4. By pressing a print key (not shown) on the copying apparatus 2, a partition (not shown) is placed on top of the originals 4 and only the lowermost original 4 corresponding to the first page of the originals placed on the original table 5 is fed out by one complete rotation of the pull-in roller 7 and separation roller 8. The pulled-out original 4 is fed onto the contact glass plate 15 of the original exposure section 14 by the pull-out roller 12.

At the original exposure section 14, the original 4 fed out onto the contact glass plate 15 is conveyed by the conveyor belt 16 to a predetermined exposure position, where the original is then exposed to light. After this exposure, the original 4 is fed to the original reversing section 20.

At the original reversing section 20, the reversing roller 21 is rotating in the clockwise direction at this time, so that the original 4 is delivered to the first reversing path 23. When the reversing sensor 26 senses the tailing end of the original 4 in the case of the single-side copy, the reversing roller 21 which has been rotated in the clockwise direction so far is now reversed, so that the original 4 is delivered toward the second reversing path 24 along the reversing guide 25.

As shown in FIG. 3, the original 4 is switched back at that time, and passes along the second reversing path 24, so that it is fed with its image facing downwardly as before. The original 4 is then fed out by the conveyance roller 27 to the conveyance path 29 of the original conveyance section 28.

At the original conveying section 28, the original 4 fed to the conveyance path 29 is fed toward the original discharge section 31 by the conveyance rollers 30.

At the original discharge section 31, when the discharge sensor 32 senses the tailing end of the original 4, the discharge roller 33 is switched from its high speed rotation, for example, of about 700–900 mm/s to its lower speed rotation, for example, of about 300 mm/s, whereby the original is discharged onto the original table 5 of the original feed-out section 3 without being fed in an unexpected direction. When a predetermined time has elapsed, the feed lever 35 is lowered by a solenoid (not shown) and the pull-back roller 34 contacts the discharged original 4 to pull back the document 4 to the vicinity of the separation roller 8 and stopping member 9 of the original feed-out section 3. Thus the single-side copy of the first original is completed.

Similarly, the second and subsequent originals are sequentially copied on their single-sides. When all the originals 4 are copied, a sensor (not shown) senses the partition plate, it is determined that one cycle has been completed and a cycle counter (not shown) is increased by one increment. Thereafter, the above series of operations is repeated by the set number of copies and all the single-side copy operations are completed.

As just described, the originals 4 on which single-side copy is completed are set with their respective images facing downwardly and with the original corresponding to the first page being set at the lowermost position as in the initial state of the originals before performing single-side copy of the originals.

How a sheet of transfer paper 36 is subjected to single-side copy on the copying apparatus 2 while the single-side copy is being performed in the apparatus 1 will be described with reference to FIG. 6 by focusing mainly to portions of the copy unit, which involve the movement of the transfer paper 36.

When single-side copy is started, a first sheet of transfer paper 36 is pulled in by the pull-in rollers 39 and copy is performed by the photosensitive drum 40 onto the transfer paper 36. Thereafter, the transfer paper 36 is turned inside out by a reversing device (not shown) disposed in the copying apparatus 2. Thus the transfer surface of the transfer paper 36 which is kept facing upwardly so far now faces downwardly. The transfer paper 36 is discharged from the discharge rollers 43 while keeping the transfer surface thereof facing downwardly and accommodated in an external tray 44 and thus the first single-side copy is completed. Quite similar single-side copy is performed onto the second and subsequent originals sequentially.

As just described above, the respective sheets of transfer papers 36 onto which single-side copy has been completed are taken out in the state where, as in the originals 4 stacked at the apparatus 1, the respective sheets of transfer papers are sequentially stacked so that their copied transfer surfaces face downwardly and a first sheet of transfer paper which corresponds to the first page of the original is placed at the lowermost position.

Both-side copy will now be described with reference to FIGS. 1, 2 and 4, 5. In that case, the operation of the original feed-out section 3, original exposure section 14, original conveying section 28 and original discharge section 31 is quite the same as in the single-side copy and further description thereon will be omitted. Here, the movement of the originals 4 at the original reversing section 20 will mainly be described.

When this both-side copy is performed, the odd-number pages (1, 3, ...) of the originals are first copied and the even-number pages (2, 4, ...) of the originals opposite to the odd-number pages thereof are then copied.

How to copy the odd-number pages will be described with reference to FIGS. 1, 2 and 4.

At the original feed-out section 3, originals 4 to be copied are sequentially set on the original table 5 such that a first sheet of the originals which corresponds to the first page is placed at the lowermost position and image surfaces on the odd-number pages of the originals face downwardly. When both-side copy is started, the first sheet of the originals which corresponds to the first page and is placed at the lowermost position on the table 5 is first fed out and copied at the original exposure section 14.

Thereafter, the following processing is performed at the original reversing section 20. When such both-side copy is performed, the reversing roller 21 is always rotated in the clockwise direction without rotating in the counter-clockwise direction, so that the first sheet of originals 4 fed from the original exposure section 14 is delivered as it is toward the first reversing path 23 by the clockwise rotation of the roller 21.

Figure 4:
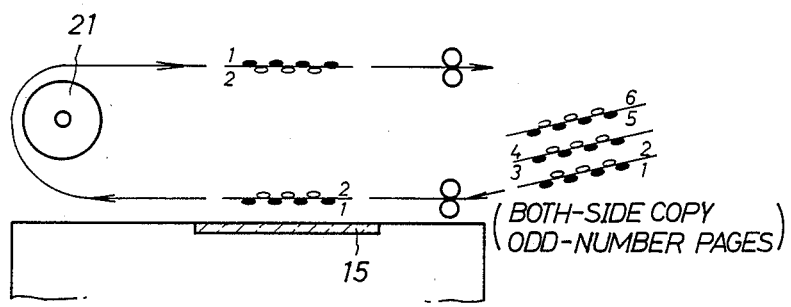
FIG. 4 illustrates the movement of an original in a case of copying odd-number pages in the both-side copying mode.

At that time, as shown in FIG. 4, the original 4 passes along the first reversing path 23 and the image on the odd-number page which faces downwardly so far is reversed so as to face upwardly and fed as it is.

The first sheet of the original 4 is fed to the conveyance path 29 of the original conveying section 28 by the conveyance roller 27 and further to the original discharge section 31. When the first sheet of the original is discharged to the original table 5 with its image surface on the odd-number page facing upwardly, the copy of the first sheet of the original 4 is completed. Similarly, the second and subsequent originals 4 are sequentially copied and thus all the originals 4 are copied.

Thus copied originals 4 are sequentially set in the state where their images on the copied odd-number pages face upwardly and the first sheet of the originals is placed at the lowermost position.

Under such conditions where the originals 4 are set as just described above, copy of the even-number pages of the originals will be described with reference to FIGS. 1, 2 and 5.

Originals are, in order, set on the original table 5 of the original feed-out section 3 in the state where the images on the even-number pages face downwardly and the first sheet of the originals which corresponds to the second page is placed at the lowermost position. When both-side copy is started, the first sheet of the originals which corresponds to the second page and is placed at the lowermost position is first extracted. Thereafter, quite the same processing as in the odd-number page copy will be performed.

Namely, the first sheet of the original is copied on the original exposure section 14, the original 4 subsequent to the first sheet is thereafter fed to the original exposure section 14, and further to the original reversing section 20 and hence the original is fed to the first reversing path 23 by the reversing roller 21 which has been rotating in the clockwise direction.

Figure 5:
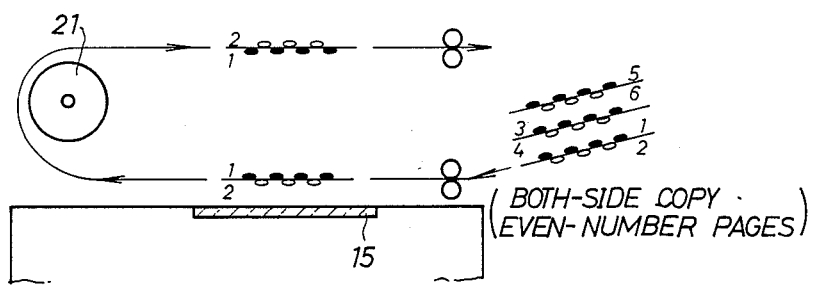
FIG. 5 illustrates the movement of an original in a case of copying even-number pages in the both-side copying mode.

At that time, as shown in FIG. 5, when the original 4 has passed along the first reversing path 23, images on the even-pages which are kept facing downwardly so far are reversed so as to now face upwardly and fed as they are.

After the original 4 is fed from the first reversing path 23 to the conveyance path 29 of the original conveying section 28, it is discharged from the original discharge section 31 in the state where its image on the even-number page faces upwardly, and thus copy of the first sheet of the original is completed. The second and subsequent originals 4 are quite similarly processed and are sequentially set in the state where their images on the even-number pages face upwardly and the first sheet of the original is placed at the lowermost position.

As just described above, in the same way as in the state of the originals which have been firstly set before start of the both-side copy, the originals 4 on which both-side copy is completed are sequentially set in the state where their images on the odd-number pages face downwardly and the first sheet of the originals which corresponds to the first page is placed at the lowermost position. Thereafter, a series of such operations for the odd-number and even-number pages is repeated by the set number of copies and thus all the both-side copying operations are completed.

Here, how both-side copy is performed on a sheet of transfer paper 36 at the main body of copying apparatus 2 while both-side copy is being performed at the apparatus 1 will be described by focusing mainly to portions of the copying apparatus, which involve the movement of the transfer paper 36.

The movement of the transfer paper 36 onto which an odd-number page is copied will be described with reference to FIG. 7.

When the copy of odd-number pages is started, a first sheet of transfer paper 36 is pulled in from the pull-in rollers 39 and copy is performed onto the first sheet of transfer paper by the photosensitive drum 40. Thereafter, the first sheet of transfer paper is drawn back by the rollers 42 with its copied transfer surface facing upwardly and accommodated in the both-face tray 41. The second and subsequent sheets of transfer papers are quite similarly processed sequentially.

As just described above, the respective sheets of transfer papers 36 onto which odd-number pages have been copied are sequentially set in the state where, as in the originals 4 set at the apparatus 1, the first sheet of transfer paper is placed at the lowermost position and their copied transfer surfaces on the odd-number pages face upwardly.

The movement of respective sheets of transfer papers 36 onto which the copy of the even-number pages is performed will be described with reference to FIG. 8. The respective sheets of transfer papers 36 onto which the copy of the odd-number pages have performed are set, in order, on the both-side tray 41 in the state where their uncopied surfaces face downwardly and the first sheet of transfer paper is placed at the lowermost position. At the time, when the copy of the even-number pages is started, the first sheet of transfer paper 36 placed at the lowermost position on the both-side tray 41 is drawn out by the rollers 42.

By this drawing-out operation, the first sheet of transfer paper 36 is reversed and fed to the photosensitive drum 40 with the uncopied surface of the transfer paper facing upwardly. After the even-number page is copied by the drum 40 onto the first sheet of transfer paper, it is discharged from the discharge roller 43 in the state where the transferred surface on the even-number page faces upwardly and is accommodated in an external tray 44 and thus the both-side copy of the first sheet is completed. The second and subsequent sheets of transfer papers will be sequentially processed similarly.

As just described above, the respective sheets of transfer paper 36 onto which both-side copy has been completed are sequentially set in the state where the images on the odd-number pages face downwardly and the first sheet corresponding to the first page of the original is placed at the lowermost position as in the state of the originals 4 set in the apparatus 1.

What is claimed:

1. An apparatus for automatically and circulatively feeding originals comprising:
   an original feed-out section for sequentially feeding out the originals stacked therein from an original placed at a lowermost position, each image to be copied of the stacked original being kept facing downwardly;
   an original exposure section disposed along the direction of movement of the fed-out original for exposing the fed-out original;
   an original reversing section disposed on the opposite side to the original feed-out section with respect to the original exposure section, and having a reversing roller capable of rotating in both clockwise and counterclockwise directions for reversing the direction of movement of the original exposed at the original exposure section;
   a first reversing path extending from a top of the reversing roller in the direction of the original feed-out section for guiding the original in the direction opposite to the direction of movement of the exposed original by means of clockwise rotation of the reversing roller when both-side copy is performed;
   a second reversing path extending from a bottom of the reversing roller in the direction of the original feed-out section for guiding the original in the direction opposite to the direction of movement of the exposed original by means of counterclockwise rotation of the reversing roller when single-side copy is performed;
   a conveyance path connected at one end thereof with the first and second reversing paths and extending from the connected portion of the first and second reversing paths in the direction of the original feed-out section;
   an original discharge section connected to the other end of the conveyance path and disposed above the original feed-out section for discharging the original conveyed along the conveyance path thereinto;
   wherein the original discharge section comprises:
   a discharge sensor for checking the presence of the original fed out of the conveyance path;
   a discharge roller for discharging toward one end of an original table the original fed out of the conveyance path; and
   a pull-back roller connected to the discharge roller through a lever for guiding the original discharged by the discharge roller to the vicinity of the separation roller.

2. An apparatus for automatically and circulatively feeding originals according to claim 1, wherein the original feed-out section comprises:
   said original table on which the originals are placed;
   a pull-in roller disposed at a position corresponding to the originals placed on the original table and driven separately for separating the originals sheet by sheet;
   a separation roller disposed downstream of the pull-in roller with respect to the direction of movement of the originals and driven separately for separating the originals sheet by sheet in association with the pull-in roller;
   pull-out roller means including a pair of rollers disposed downstream of the separation roller with respect to the direction of movement of the original for feeding to the original exposure section an original separated from the remaining originals by the pull-in roller and separation roller; and
   means disposed downstream of the pull-out roller means with respect to the direction of movement of the original for checking the passage of the original through the pull-out roller means.

3. An apparatus for automatically and circulatively feeding originals according to claim 2, wherein the separation roller is so adapted as to idle when it receives a force exceeding a predetermined value from the original.

4. An apparatus for automatically and circulatively feeding originals according to claim 2, wherein the pull-out roller means is so adapted as to provide to the original a high roller pressure, to thereby carry the original against a pressure produced by the remaining stacked originals.

5. An apparatus for automatically and circulatively feeding originals according to claim 2, wherein the original feed-out section further comprises a stopping member disposed above the separation roller for guiding, in association with the separation roller, toward the pull-out roller means the original fed out from the pull-in roller;
an inlet pawl disposed above the stopping member for stopping the originals on the original table; and
a pushing member disposed above the inlet pawl for pushing the original on the original table from above.

6. An apparatus for automatically and circulatively feeding originals according to claim 1, wherein the original exposure section comprises:
a contact glass plate extending in the direction of movement of the original;
an endless conveyor belt extending between two rollers respectively disposed above both longitudinal ends of the contact glass plate, for conveying the original fed to the original exposure section while contacting the fed original to the contact glass plate; and
belt presser means disposed in contact with one surface of the endless conveyor belt which is opposite to the other surface of the endless conveyor belt facing to the contact glass plate for pressing the other surface to the contact glass plate to thereby move the original.

7. An apparatus for automatically and circulatively feeding originals according to claim 6, wherein the belt presser means comprises a plurality of belt presser rollers spaced apart from each other, and extending perpendicular to the direction of movement of the belt.

8. An apparatus for automatically and circulatively feeding originals according to claim 1, wherein the original reversing section includes:
an auxiliary roller disposed in contact with the reversing roller on the opposite side to the original feed-out section with respect to the reversing roller for moving the original along the outer circumferential surface of the reversing roller while the reversing roller is rotating in the clockwise direction;
a reversing guide disposed below the reversing roller for guiding the original on the reversing roller to the second reversing path when the reversible roller is rotated in the counterclockwise direction; and
a reversing sensor disposed between the reversing guide and the auxiliary roller for sensing a tailing end of the original which is being conveyed by the reversing roller in the direction of the first reversing path and for switching rotation of the reversing roller from the clockwise direction to the counterclockwise direction.

9. An apparatus for automatically and circulatively feeding originals according to claim 1, comprising conveyor means disposed in the conveyance path for conveying to the original feed-out section the original fed out of the first or second reversing path.

10. An apparatus for automatically and circulatively feeding originals according to claim 9, wherein the conveyor means includes a plurality of pairs of second conveyance rollers, each pair of the second conveyance rollers being spaced apart from each other.

11. An apparatus for automatically and circulatively feeding originals according to claim 1, wherein the conveyance path has a linear shape.

* * * * *